United States Patent
Xiong (10) Patent No.: US 11,343,788 B2
(45) Date of Patent: May 24, 2022

(54) TRANSMISSION OF POSITION REFERENCE SIGNALS WITHIN WIRELESS TELECOMMUNICATION NETWORK

(71) Applicant: Nokia Solutions and Networks Oy, Espoo (FI)

(72) Inventor: Zhilan Xiong, Bristol (GB)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/325,109

(22) PCT Filed: Aug. 11, 2017

(86) PCT No.: PCT/EP2017/070403
§ 371 (c)(1),
(2) Date: Feb. 12, 2019

(87) PCT Pub. No.: WO2018/029331
PCT Pub. Date: Feb. 15, 2018

(65) Prior Publication Data
US 2021/0282106 A1    Sep. 9, 2021

(30) Foreign Application Priority Data
Aug. 12, 2016    (EP) .................................... 16183943

(51) Int. Cl.
*H04W 64/00*    (2009.01)
*G01S 1/04*    (2006.01)
(Continued)

(52) U.S. Cl.
CPC ............. *H04W 64/00* (2013.01); *G01S 1/042* (2013.01); *G01S 1/20* (2013.01); *H04L 5/0005* (2013.01); *H04L 5/0053* (2013.01); *H04W 48/10* (2013.01)

(58) Field of Classification Search
CPC ....... H04W 64/00; H04W 48/10; G01S 1/042; G01S 1/20; H04L 5/0005; H04L 5/0053
See application file for complete search history.

(56) References Cited

U.S. PATENT DOCUMENTS

| 2011/0110338 A1 | 5/2011 | Khoryaev et al. |
| 2012/0094687 A1 | 4/2012 | Choi et al. |

(Continued)

FOREIGN PATENT DOCUMENTS

| CN | 102056292 A | 5/2011 |
| CN | 103155457 A | 6/2013 |

(Continued)

OTHER PUBLICATIONS

MCC Support, "Final Report of 3GPP TSG RAN WG1 #85 v1.0.0 (Nanjing, China, May 23-27, 2016," 3GPP TSG RAN WG1 Meeting #86, R1-166056, pp. 1-170, Goteborg, Sweden, Aug. 22-26, 2016.

(Continued)

*Primary Examiner* — Khai M Nguyen
(74) *Attorney, Agent, or Firm* — Fay Sharpe LLP (57) ABSTRACT

A method performed at a beacon for broadcasting position reference signals and a method performed at a network control node, a beacon, a network control node and a computer program are disclosed. The method performed at the beacon comprises: transmitting a network access signal indicative of a geographical location of the beacon; receiving a network control signal from a network control node, the network control signal comprising a configuration control signal indicative of configuration information for broadcast of the position reference signals; and broadcasting position reference signals in accordance with the configuration information.

18 Claims, 3 Drawing Sheets

(51) Int. Cl.
*G01S 1/20* (2006.01)
*H04L 5/00* (2006.01)
*H04W 48/10* (2009.01)

(56) References Cited

U.S. PATENT DOCUMENTS

| | | | | |
|---|---|---|---|---|
| 2014/0176366 A1* | 6/2014 | Fischer | ............... | H04W 64/006 |
| | | | | 342/374 |
| 2015/0365790 A1* | 12/2015 | Edge | ........................ | G01S 19/11 |
| | | | | 455/404.2 |
| 2017/0288830 A1* | 10/2017 | Fischer | ..................... | G01S 5/10 |
| 2017/0331577 A1* | 11/2017 | Parkvall | ............... | H04B 7/0848 |
| 2019/0124466 A1* | 4/2019 | Masterson | ............... | H04L 51/20 |

FOREIGN PATENT DOCUMENTS

| | | | |
|---|---|---|---|
| EP | 3917203 A1 * | 1/2020 | |
| WO | 2014105324 A1 | 7/2014 | |
| WO | 2015192113 A1 | 12/2015 | |
| WO | 2015192884 A1 | 12/2015 | |

OTHER PUBLICATIONS

International Search Report for PCT/EP2017/070403 dated Sep. 11, 2017.
English Bibliography of Chinese Patent Application No. CN102056292A, Published May 11, 2011, Printed from Derwent Innovations on Jul. 24, 2020, 10 pages.
English Bibliography of Chinese Patent Application No. CN103155457A, Published Jun. 12, 2013, Printed from Derwent Innovations on Jul. 24, 2020, 7 pages.
Partial European Search Report for EP Application No. 16183943.6, dated Dec. 20, 2016, 6 pages.
Extended European Search Report for EP Application No. 16183943.6, dated Apr. 18, 2017, 13 pages.
Written Opinion of the International Searching Authority for PCT/EP2017/070403, dated Sep. 9, 2017, 9 pages.

* cited by examiner

TRANSMISSION OF POSITION REFERENCE SIGNALS WITHIN WIRELESS TELECOMMUNICATION NETWORK

FIELD OF THE INVENTION

The field of the invention relates to the transmission of position reference signals for use in the detection of user equipment position within a wireless telecommunication network.

BACKGROUND

OTDOA or observed time difference of arrival is a downlink positioning method used in networks for detecting a user equipment's position. In particular, network nodes transmit PRS position reference signals and these are detected by user equipment. The time of arrival of the different signals at the user equipment and in particular, the RSTD reference signal time difference measurement at the user equipment can be used as an indication of its location.

The PRS signal is delivered with a predefined bandwidth and a set of configuration parameters such as periodicity, duration and subframe offset. The PRS are broadcast in predefined positioning subframes grouped by several consecutive subframes which form predefined time periods, termed PRS occasions. These repeat a certain number of times and with a certain periodicity. In addition, the network node may be configured for time based blanking so-called PRS muting during a subset of these repeating PRS occasions when the PRS signal is muted. This allows PRS signals from cooperating network nodes involved in the OTDOA to be more easily detected by the user equipment.

One potential problem with existing OTDOA solutions is that the PRS is transmitted by eNB and/or small cells and as the main purpose of these network nodes is data transmission, the resources for the PRS transmission and OTDOA positioning are limited. Furthermore, due to the deployment costs of these complex nodes, the number of deployed nodes for PRS transmission may not be sufficient for accurate positioning.

It would be desirable to provide additional nodes for generating PRS signals which have lower capital and deployment costs.

SUMMARY

A first aspect of the present invention provides a method performed at a beacon for broadcasting position reference signals, said method comprising: transmitting a network access signal indicative of a geographical location of said beacon; receiving a network control signal from a network control node, said network control signal comprising a configuration control signal indicative of configuration information for broadcast of said position reference signals; and broadcasting position reference signals in accordance with said configuration information.

The inventors of the present invention recognised the problems associated with increasing the positioning accuracy of OTDOA by using more network nodes and determined that one solution might be to deploy beacons. Beacons are low cost/low complexity nodes, which are configured to broadcast specified signals, and do not require the more complex and expensive circuitry associated with transmitting, receiving and decoding data signals from user equipment. In order for such beacons to be used in OTDOA they need not only broadcast position reference signals but the network needs to be aware of their geographical location such that the determined time difference of arrival between different signals can be linked to position. In this regard the RSTD reference signal time difference measurement signal generated at the UE is transmitted to its serving network node which forwards it to a network control node such as a location server which determines the position. Thus, these beacons are configured to transmit an indication of their geographical location to the network. The configuration of the PRS signals that they broadcast also needs careful control by the network. Thus, an aspect of the invention provides a beacon configured to perform a method whereby a signal indicative of its geographical location is transmitted and a network control signal is received from a network control node, which signal provides some central network control of the configuration of the PRS signal such that it can be broadcast in conjunction with other neighbouring cooperating network nodes without undue interference between the signals. The RSTD responses to the PRS signals broadcast by the beacon are received at the network node serving the responding UE. Thus, the low complexity beacon does not require a receiver for receiving signals from a UE.

In some embodiments, the network control signals are received from a network control node via a backhaul link which may be a wired link or a wireless link.

In some embodiments, the method comprises, prior to receiving said network configuration control signal: generating position reference signal configuration information and transmitting said position reference signal configuration information as a configuration information signal to said network control node; wherein said network configuration control signal comprises one of a confirmation signal indicating said position reference signal configuration information generated by said beacon is to be used, or a configuration information signal indicating updated configuration information for broadcast of said position reference signal.

In some embodiments, rather than receiving configuration information from the network, the beacon may generate its own position reference signal configuration information. However, as noted previously, there needs to be some central knowledge and control of this configuration information in order for the technique to operate effectively. Thus, where this is the case then this information will be transmitted to the network control node and the network configuration control signal that is received will be in response to this and it may be a confirmation signal indicating that the position reference signal configuration information that the beacon generated is ok to use, or it may be an updated configuration information signal indicating new configuration information that the beacon should use in the place of its own generated position reference signal configuration information.

In some embodiments, the step of generating said position reference signal configuration information comprises one of: generating said configuration information in accordance with a predefined generation mechanism stored within said beacon; and generating said configuration information in accordance with a random mechanism operable to randomly select time and frequency resources for transmission of said position reference signals within a set of predefined available resources.

The generating of the configuration information within the beacon may be done in accordance with a predefined generation mechanism, the mechanism taking account of the requirements of the system, the available resources and in some cases a knowledge of the configuration of other cooperating nodes. Alternatively, it may be done using a random mechanism which selects time and frequency resources for the broadcast of the position reference signals from a set of predefined available resources. In this regard, there may be resources that are available for PRS signals, and by randomly assigning them to different beacons it may be that the resources that are assigned are often different to those assigned by other nodes and therefore suitable for reception by user equipment. This may be an acceptable way of generating such configuration information, as the network control node will review these and will be able to refuse the use of these resources and provide updated configuration information where it determines that they are not appropriate.

With regard to the generating mechanism stored within the beacon, the properties of this may be entered manually or they may be entered at deployment or configuration. In the latter case, the properties that are entered may take account of the resources used by cooperating network nodes for the broadcast of their PRS signals and this helps the beacon to select appropriate resources.

In some embodiments, the network configuration control signal comprises a configuration information signal indicating a time and frequency resource for broadcast of the position reference signal.

The configuration control signal received from the network may comprise configuration information which may include an indication of a time and frequency resource for broadcast of the position reference signal. In this regard, in order for the responses to the PRS signals to be interpreted and indeed to be successfully received by the user equipment, the time and frequency resource of their broadcast must be known within the network. Furthermore, as different nodes are cooperating in this position detection technique these signals should be broadcast in such a way that they can be individually received by user equipment and interference is reduced. Thus, having a network control node involved in the configuration of the broadcast of these signals allows the configuration to be selected with some central control and these requirements to be met.

In some embodiments, in addition to indicating time and frequency resource for the broadcast, the configuration information may further comprise at least one of: a frequency bandwidth of said position reference signal; a frequency hopping pattern indicating a frequency difference between subsequent position reference signal blocks transmitted within a position reference signal time period; a period of repetition of said position reference signal time period; a number of position reference signal blocks transmitted in each of said position reference signal time periods; a number of physical resource sub-blocks from each physical reference signal block; and a muting pattern indicating time frequency resources within the position reference signal time period during which no position reference signals or data signals are to be transmitted.

In some embodiments, the network access signal comprises at least one of: an indication of carrier frequencies supported by said beacon, a system frame number initialisation time, a beacon identifier, an access point position indicating an estimated geographical position of an antenna of said beacon, an indication of position reference signal transmission power, a request for positon reference signal configuration information an indication of physical reference signal transmission capacity and a tracking area code.

The network access signal transmitted from the beacon is indicative of the geographical location of the beacon, as this is required by the network in order for it to be able to determine user equipment location. Further information may also be transmitted and may include an indication of the carrier frequency supported by the beacon; this may be important where the network control node is assigning the resources, via the configuration information, to be used by the beacon for transmitting the PRS signals. There may also be a system frame number initialization time which allows the beacon and the network to be synchronised and allows the time differences of arrival of PRS signals from different nodes at the user equipment to provide an accurate indication of position. The signal may also comprise a beacon identifier, an access point position indicating an estimated geographical position of the antenna of the beacon and these may form the geographical location indicators or they may be in addition to other geographical location indicators. The network access signal may also comprise an indication of the PRS signal transmission power and in some cases it may include a request for PRS signal configuration information and/or an indication of physical reference signal transmission capacity and a tracking area code.

In some embodiments, the step of transmitting a network signal indicating a geographical location of the beacon comprises transmitting a signal indicating multiple transmission points and corresponding indications of multiple geographical locations for said beacon, said configuration control signal being indicative of configuration information for broadcast of said position reference signals from each of said multiple transmission points.

In some embodiments, the beacon may comprise multiple transmission points, perhaps in the form of multiple antennae, and in such a case the signal indicating the geographical location of the beacon will indicate multiple geographical locations corresponding to the multiple transmission points. Such a beacon can be used for transmitting signals perhaps in different directions towards different user equipment, and in order for the position of user equipment to be determined accurately the geographical location of each transmission point should be known.

A second aspect of the present invention provides a beacon for broadcasting position reference signals, said beacon comprising: a transmitter for transmitting a network access signal indicating a geographical location of said beacon; a receiver for receiving a network control signal from a network control node, said network control signal comprising a configuration control signal indicative of configuration information for broadcast of said position reference signals; wherein control circuitry is configured to control said transmitter to broadcast position reference signals in accordance with said received configuration information.

In some embodiments, said beacon further comprises a position reference signal configuration information generator operable to generate position signal configuration information, said transmitter being operable to transmit said position reference signal configuration information as a configuration information signal to said network control node; wherein said network configuration control signal comprises one of a confirmation signal indicating said position reference signal configuration information generated by said beacon is to be used, or a configuration information signal indicating updated configuration information for broadcast of said position reference signal.

In some embodiments, said configuration information signal comprises an indication of a time and frequency resource for broadcast of said position reference signal.

In some embodiments, said network access signal comprises at least one of: an indication of carrier frequencies supported by said beacon, a system frame number initialisation time, a beacon identifier, an access point position indicating an estimated geographical position of an antenna of said beacon, an indication of position reference signal transmission power, a request for positon reference signal configuration information an indication of physical reference signal transmission capacity and a tracking area code.

A third aspect of the present invention provides a method performed at a network control node comprising: receiving a network access signal indicating a geographical location of a beacon; a configuration control signal generator operable to generate a configuration control signal; transmitting said configuration control signal to said beacon, said configuration control signal being indicative of configuration information for broadcast of position reference signals; and receiving user equipment responses to said broadcast position reference signals.

Where it has been determined to deploy beacons to transmit PRS signals to improve the location detection accuracy then the configuration of the PRS signals broadcast by these beacons may be controlled centrally at a network control node. Such a network control node will receive a network access signal from the beacons and from this will be able to determine their geographical location. The network control node can then transmit a configuration control signal to the beacon and this will be indicative of configuration information for broadcast of the PRS signals. The network control node will also be responsible for determining the user equipment positions and will do this by receiving user equipment responses to the PRS signals broadcast by the different nodes within the network. In this regard, having received an indication of geographical location and having transmitted the configuration control signal, the network control node will be aware of both the location of the beacon and the configuration of the PRS signals broadcast by it and can it therefore interpret signals received from the user equipment in response to these PRS signals.

In some cases, the method comprises a further step of receiving a configuration information signal comprising position reference signal configuration information from said beacon and transmitting as said network configuration control signal one of: a confirmation information signal indicating said received position reference signal configuration information is to be used; or a configuration information signal indicating updated configuration information for broadcast of said position reference signal.

The configuration information for the beacon may be generated at the beacon itself and the network control node will receive a signal indicating what this configuration information signal is. The network control node will then determine whether this configuration is appropriate, given its knowledge of the other nodes within the system, and where it is appropriate it will transmit a confirmation signal to the beacon indicating that the configuration information is ok to use. If it determines that it is not suitable, it will transmit updated configuration information indicating configuration information that should be used by the beacon for the broadcast of PRS signals. In this way, the beacon may itself generate the configuration for the PRS signals, but these are still centrally controlled by the network control node.

In other embodiments, said configuration control signal comprises a configuration information signal indicating a time and frequency resource for broadcast of said position reference signal.

In alternative embodiments, rather than the beacon generating the configuration information, the network control node will generate it and in this case the configuration control signal will comprise a configuration information signal which will include at least the time and frequency resource for broadcast of the position reference signal and may include other configuration information.

In some embodiments, the method further comprises receiving a plurality of network access signals indicating a corresponding plurality of geographical location of a plurality of beacons; transmitting a plurality of configuration control signal to said plurality of beacons, said configuration control signal being indicative of configuration information for broadcast of position reference signals; and receiving user equipment responses to a plurality of broadcast position reference signals; and determining a position of a user equipment from said received signals.

The network control node acts as the location determiner and, in addition to receiving network access signals from a plurality of beacons and providing them with configuration control signals, the network control node also receives user equipment responses to the plurality of broadcast position reference signals which are broadcast by the nodes within the network, which nodes include beacons but may also include other network nodes. From these signals a position of a user equipment will be determined and this information may be transmitted back to the network node serving those user equipment.

The network control node may be a number of things and in some embodiments the network control node comprises one of a location server, a network node comprising a base station or E-UTRAN node B, a small cell node and an OAM operations administration and maintenance server.

Although the network control node may be in a conventional location server, in some embodiments it is placed within one of the network nodes of the system which makes the determination of the position of the user equipment less subject to delay and thus, where the user equipment are moving, increases the accuracy.

A fourth aspect of the present invention provides a network control node comprising a receiver configured to receive network access signals indicating a geographical location of a beacon; a configuration control signal generator operable to generate a configuration control signal; a transmitter operable to transmit said configuration control signal to said beacon said configuration control signal being indicative of configuration information for broadcast of position reference signals; and wherein said receiver is configured to receive user equipment responses to said broadcast position reference signals.

In some embodiments, the network control node receiver is further configured to receive a configuration information signal comprising position reference signal configuration information from said beacon and said configuration signal generator is configured to generate as said network configuration control signal one of: a confirmation information signal indicating said received position reference signal configuration information is to be used; or a configuration information signal indicating updated configuration information for broadcast of said position reference signal.

In some embodiments, said configuration control signal generator is configured to generate a configuration information signal indicating a time and frequency resource for broadcast of said position reference signal.

In some embodiments, said receiver is configured to receive a plurality of network access signals indicating a corresponding plurality of geographical location of a plurality of beacons; and said transmitter is configured to transmit a plurality of configuration control signal to said plurality of beacons, said configuration control signal being indicative of configuration information for broadcast of position reference signals; and said receiver is configured to receive user equipment responses to a plurality of broadcast position reference signals; said network control node comprising position determination logic configured to determine a position of a user equipment from said received signals.

In some embodiments, said network control node comprises one of a location server, a network node comprising a base station or E-UTRAN node B, a small cell node and an OAM operations administration and maintenance server.

A fifth aspect of the present invention provides a computer program which, when executed by a processor, is operable to control said processor to perform a method according to a first or third aspect of the present invention.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing the embodiments in any more detail, first an overview will be provided.

Determining the position of a user equipment using OTDOA or observed time difference of arrival for signals transmitted by nodes within a network is one way of determining UE positioning which can have a high level of accuracy but which may use significant amount of network resources. Furthermore, in order for the determination to have a high degree of accuracy, nodes cooperating in the scheme should be deployed geographically frequently such that there are not areas without nodes and this may increase costs. The inventors of the present invention recognised these issues and addressed them by using beacons as cooperating nodes within the scheme. The beacons used are low cost nodes which are configured to transmit PRS signals.

In this regard, in order to do so in a way that is compatible with other cooperating nodes within the network also broadcasting such signals, the beacon is configured to communicate with the network to provide it with information regarding the beacon's geographical location and to cooperatively determine configuration information indicative of time and frequency resources to be used for transmitting the PRS signals with a network control node.

In this regard, in some embodiments, the beacon may generate the configuration information itself either by having the relevant configuration entered perhaps manually by an operator at deployment or on configuration of the beacon. If this is done on deployment, a knowledge of the resources used for PRS signalling by other neighbouring nodes cooperating in the scheme can be used to select a configuration to that it is suitable for the network that the beacon is being deployed within.

Alternatively, there may be some random generating mechanism within the beacon that is operable to randomly select time and frequency resources from within a set of predefined available resources to be used for the PRS signals. In either event, this configuration information is sent to a network control node which determines if it is suitable for use within the network and will either respond with confirmation information indicating that this configuration can be used, or will send an updated configuration information signal indicating configuration information that should be used.

In alternative embodiments, rather than the beacon generating configuration information for the PRS signals the network control node may determine the configuration of the PRS signals itself and this will be transmitted to the beacon in response to the network access signal received from the beacon, which signal indicates the beacon's geographical location and in some embodiments may include a configuration information request.

The network control node is configured to control the OTDOA technique and to control the PRS signalling of each of the nodes within the network that are cooperating in this technique and to forward this information to the UEs. It is also responsible for collecting the UEs responses and for determining their position. With regard to the configuration of the signals, as noted above it may receive configuration information from the different beacons and determine if this configuration is suitable or alternatively it may determine the PRS signalling itself and transmit this to the beacons. In this regard a network may have both beacons that have no configuration information generation means and which will always receive the information from a network control node, and beacons that have some generation mechanism. The network control node will be able to determine from the network access signal received from each beacon which type of beacon it is.

In this regard, the OTDOA technique being used may involve the beacons and the other network nodes broadcasting a wide band PRS signal in one or more subframes of each PRS occasion, alternatively they may transmit narrowband PRS signals and use frequency hopping between the different subframes such that signals of different frequency bandwidths are transmitted in each different subframe. This pattern of broadcast signals is repeated in each PRS occasion or PRS time period. In this regard a wideband signal may have a bandwidth similar to that of a wideband user equipment, say 10 MHZ, and the narrowband bandwidth may be similar to that of narrow band user equipment such as MTC (machine type) UEs, IoT (internet of Things) UEs and have a bandwidth of say 1.4 MHz. In the latter case where there is frequency hopping between the signals, the overall bandwidth used by the signals will be within the wider band resource of say 10 MHZ.

Figure 1:
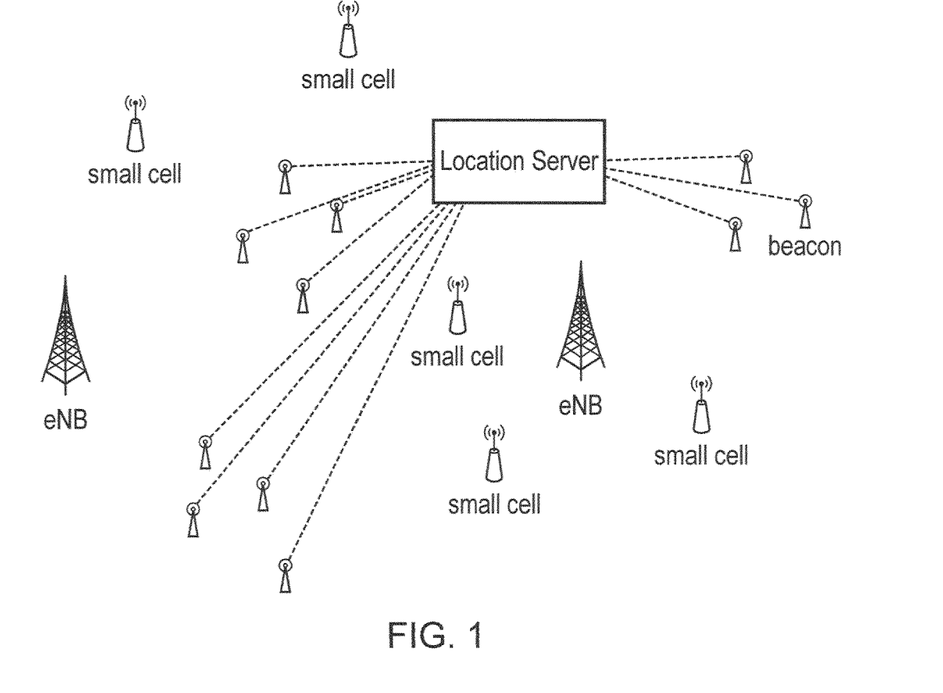
FIG. 1 illustrates a network with beacons for generating position reference signals according to an embodiment.

FIG. 1 schematically shows a OTDOA positioning system with PRS-based beacons according to an embodiment. As can be seen, there are a plurality of beacons which communicate with a control node which in this embodiment is shown as a location server but may be any one of an eNB, a small cell node or some other network receiver transmission node such as an OAM server. These beacons broadcast PRS signals within a network. In addition at least a subset of the small cells and eNBs also broadcast these signals. The control node will control the configuration of the signals broadcast such that neighbouring nodes do not broadcast PRS signals which overlap in a time and frequency resource. In this regard a muting pattern as well as a pattern of broadcast may be part of the configuration information to ensure that neighbouring nodes do not broadcast PRS signals or transmit data signals in the time frequency resource sued for PRS broadcast by another node. The control node will also process the responses received from the user equipment, which indicate a time delay of receipt of the signals from the different nodes.

The beacons will initially access the network by sending a network access signal to the network and this will be transmitted to the control node, generally by a backhaul link. This signal will indicate the geographical position of the beacon and may also include a beacon identifier, a tracking area code which also provides some indication of the geographical location, and an access point position which is the configured estimated geographical position of the antenna of the beacon. In this regard, in some embodiments a beacon may have multiple antennas, in which case multiple access point positions will be transmitted. The network access information may further comprise an indication of the supported carrier frequencies of the beacon which may be indicated by an EARFCN (E-UTRA Absolute Radio Frequency Channel Number), an indication of the bandwidth of the transmitter of the beacon, and it may also include a system frame number (SFN) initialization time which may be used by the network control node to determine at exactly what time the PRS signals are transmitted. The network access signal may also comprise a PRS transmission power, and a PRS transmission capacity indication. In embodiments where the beacon does not generate the configuration information itself then it may also include a PRS configuration information request.

Where the beacon generates its own configuration information then, following the network access signalling or as part of it, the beacon will transmit its proposed PRS configuration information to the network control node which can either respond with updated configuration information or can confirm that this configuration information is acceptable. In this regard, the beacon will have some sort of PRS configuration generation mechanism which may be defined at deployment or configuration of the beacon when there is some knowledge of where it is to be located, or it may be some random mechanism which generates such configuration information within a set of predefined resources. It should be noted that as the information is sent to the network control node, where there is some overlap with other beacons then at least one of the beacons will have its configuration information refused and updated configuration information sent. Where the network control node finds that the proposed configuration information is acceptable to the network it will send a confirmation signal to this effect.

In embodiments where the beacon does not have a configuration information generation mechanism, and in such a case may have transmitted a configuration information request, then the network control node will transmit configuration information regarding the PRS signal configuration to the beacon which will then configure the signals in this way.

The network control node will also transmit this configuration information to the various user equipment and it may do this via the network nodes and this allows the user equipment to monitor the appropriate time frequency resource for the PRS signals and to respond to them. The network control node will analyse the responses and determine the position of the user equipment from the time differences between the signals.

It should be noted that the beacons are devices for broadcasting PRS signalling for OTDOA positioning and can work with existing LTE/LTE-A network and/or on their own. The PRS-based beacon may be a plug-in device and may access the network by wired connections or wireless connections via some backhaul link.

Steps for the beacon accessing the network are now described for particular embodiments.

Step 1: the beacon sends the network access signalling to the network control node.

Step 2: the network control node sends the PRS configuration information to the beacon after receiving corresponding network access signalling from the beacon.

Step 3: the beacon transmits the PRS signalling according to the received PRS configuration information.

The network access signalling includes the beacon's geographical location and may include other aspects of the beacon's capabilities as noted previously, such as the frequencies it supports, its SFN initialization time and the geographical position of its antenna. Where there are multiple transmission points of a beacon, perhaps due to it having multiple antennae, then the network access signalling sent by the beacon will include one or more beacon point identifiers with each point identifier being associated perhaps with a partial or full tracking area code, a supported carrier frequency indication, a number of antenna points, an access point position and PRS transmission power, as well as the information mentioned above.

Where there is a single PRS transmission point per beacon then the location server will send the PRS configuration information to the beacon for the PRS configuration of this beacon. This PRS configuration information may include one or more of the following: a beacon identifier, PRS transmission power, or carrier frequency indication for PRS transmission which may include EARFCN, PRS bandwidth and/or PRS frequency hopping pattern. It may also include a sub-frame indication for the PRS transmission; for example, it may include a PRS configuration index, a number of downlink frames and/or PRS muting configuration. The muting pattern indication may be in the time and/or in the frequency domain. It may include the SFN initialization time, a number of antenna points and the cyclic prefix length of the PRS.

Where the beacon has multiple PRS transmission points then the configuration information received may include different carrier frequency indications for the PRS transmission of each transmission point and different sub-frame indications and potentially different transmission power.

The procedure for the beacon to access the network can be described generally as the following steps:

PRS beacon sends the PRS configuration information to the network control node. The PRS configuration information from the beacon might be predefined, manually inputted or randomly generated.

In a second step, the location server sends the confirmation or updated PRS configuration information to the beacon.

In the third step, the beacon transmits the PRS signalling according to the received configuration information or according to its own generated configuration information where it has received confirmation that this is acceptable.

Figure 2:
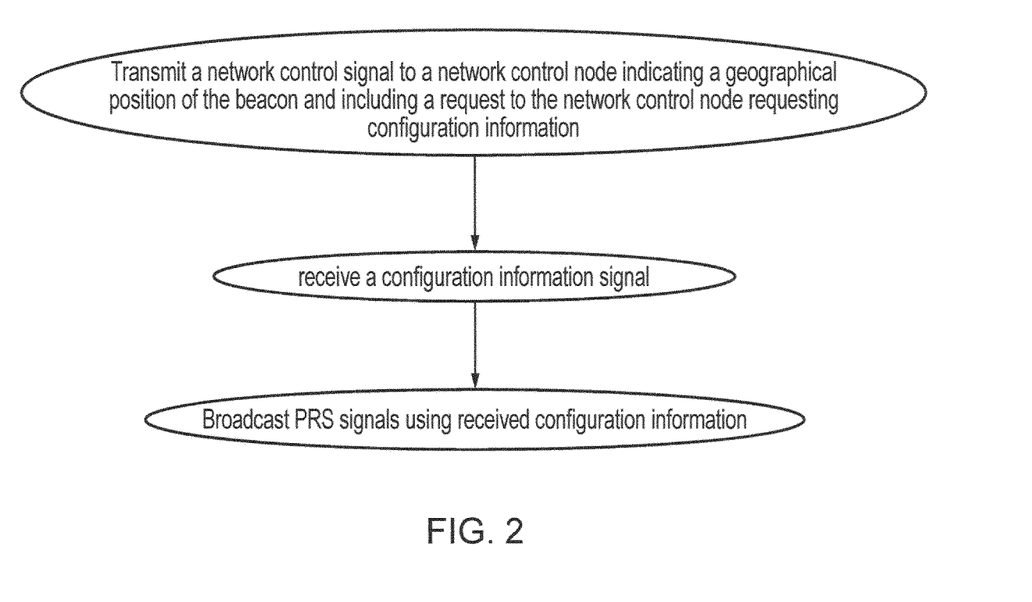
FIG. 2 illustrates steps of a method performed at a beacon according to a first embodiment.

FIG. 2 shows a flow diagram illustrating a method performed at a beacon according to one embodiment. In this embodiment, the beacon does not have a configuration information generation mechanism and as such when it transmits its initial network control signal to the network control node which includes an indication of its geographical location, the signal also includes a request to the network control node for configuration information.

In response to this the beacon receives a configuration information signal from the network control node and it can then broadcast PRS signals using the received configuration information. In this way, a very simple node can broadcast this information using a configuration that is determined more centrally by a network control node.

Figure 3:
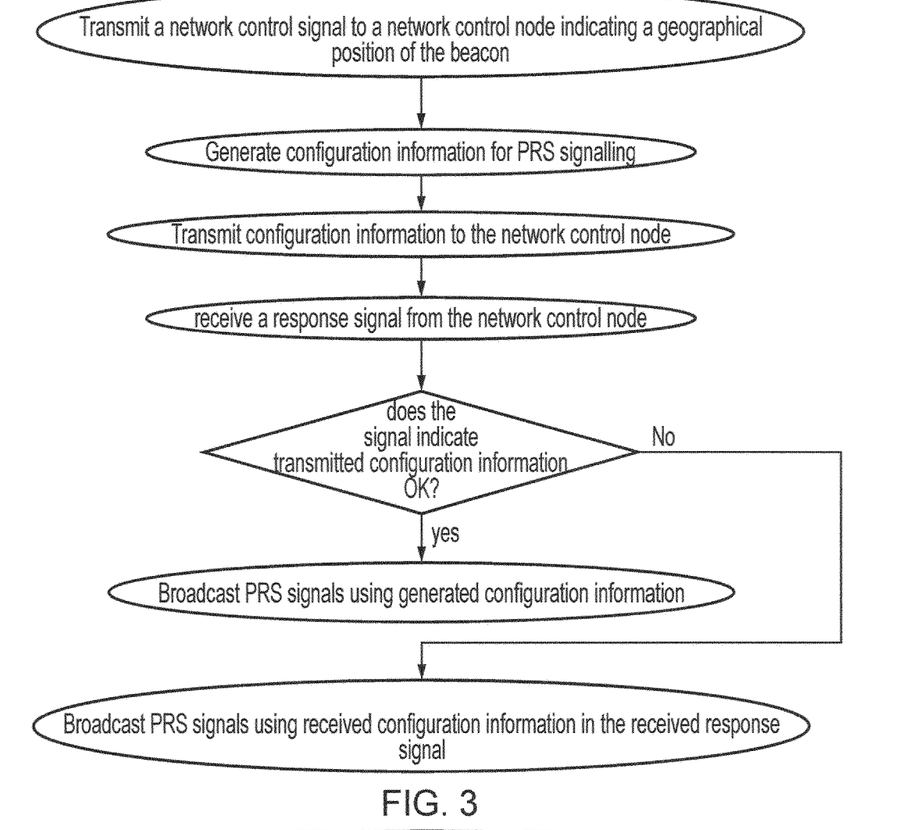
FIG. 3 illustrates steps of a method performed at a beacon according to a further embodiment.

FIG. 3 shows steps in a method performed at an alternative embodiment of the beacon. In this embodiment the beacon comprises a configuration information generation mechanism. Thus in this embodiment, the initial network control signal will simply indicate the geographical position of the beacon. This may be done by transmitting an identifier identifying the beacon perhaps with a tracking area code and/or with an estimate of the geographical location of the antenna. The beacon will also generate configuration information for PRS signalling and it may do this in response to some manual inputs or in response to some information input at deployment or it may have some random generation mechanism that generates such configuration information within predetermined bounds in a random manner. In any case, the generated configuration information is transmitted to the network control node which receives it and transmits a response. The response will either indicate that the configuration information that was generated is OK or it will send updated configuration information that it would prefer the beacon to use. In response to this signal, the beacon will either broadcast PRS signals using the generated configuration information or it will broadcast PRS signals using the received configuration information.

In this way the network control node can retain control of the PRS signals that are generated by cooperating network nodes in the system, while allowing the beacon some autonomy.

Figure 4:
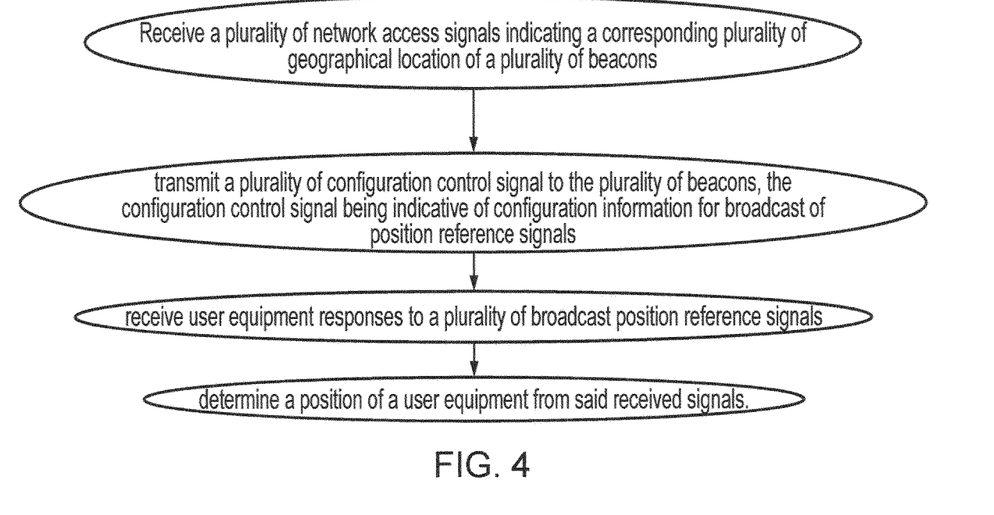
FIG. 4 illustrates steps of a method performed at a network control node according to an embodiment.

FIG. 4 shows steps in a method performed at a network control node such as a location server. The network control node will receive network access signals which will indicate the geographical locations from a plurality of beacons. It will transmit configuration control signals to the beacons. The configuration control signals will be indicative of configuration information for broadcast of position reference signals by these beacons. In this regard, where the beacons have generated their own configuration information, the control signal will indicate either that they can use this configuration information or that they should use different configuration information which will be transmitted in the signal.

Alternatively, where the beacons have no configuration information generation mechanisms, then the network control node will simply transmit some configuration information to the beacons.

The network control node will then receive user equipment responses to the broadcast position reference signals that are broadcast by the beacons and perhaps by network nodes under the control of the network control node. These received signals indicate time delays between receiving the PRS signals from different nodes at the UEs and from this information and a knowledge of the configuration of the PRS signals broadcast, the position of the user equipment will be determined and this may be transmitted to the network node serving that user equipment.

Figure 5:
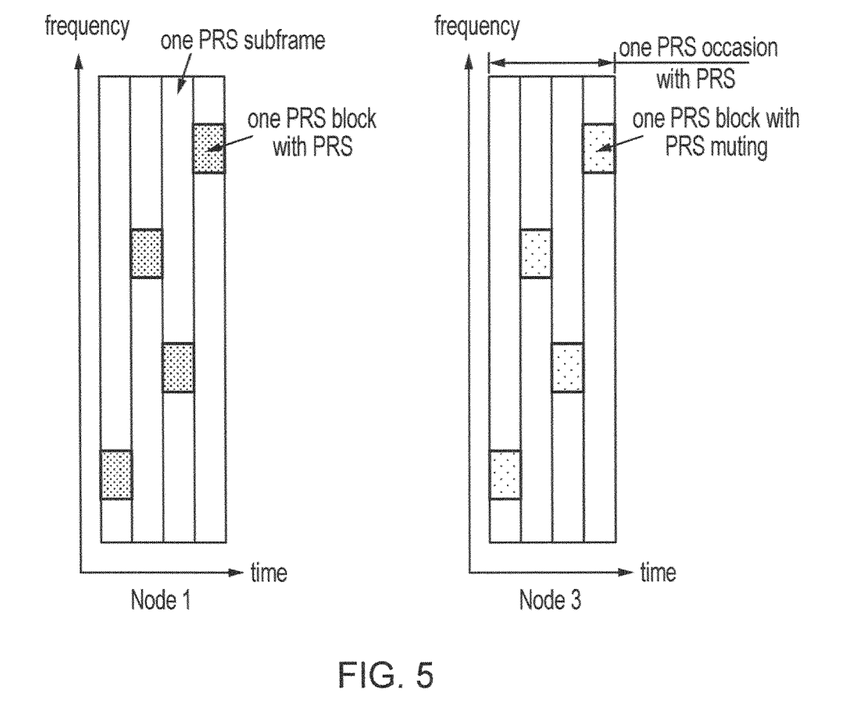
FIG. 5 shows a muting and PRS signal pattern for adjacent beacons operating in a frequency hopping mode according to an embodiment.

The PRS configuration information that is either generated at the beacon or at the network control node indicates how the PRS signals of each node are to be broadcast. It includes the frequency bandwidth of the PRS signals and the subframe(s) they are to be broadcast in. It may also indicate their pattern of broadcast. In this regard the signals are broadcast during PRS time periods termed occasions which are repeated a number of times. Thus, the periodicity and number of repetitions may be part of the configuration information along with the PRS time period. The number of PRS blocks transmitted in each of the PRS time periods, and the number of physical resource subblocks in each PRS block may also be included. Furthermore, there may be a particular pattern of broadcast and a particular pattern of muting during which no PRS or data signals are transmitted and this pattern may be included in the configuration information. There may also be a frequency hopping pattern such as is shown for two neighbouring beacons termed node 1 and node 3 in FIG. 5. In this case within each PRS time period node 1 broadcasts different PRS signal blocks in different frequency bandwidths and the frequency hopping pattern indicates a frequency difference between subsequent PRS blocks. Node 3 has a complementary muting pattern. In some cases there may be a time gap between each PRS block broadcast and this may also be included in the configuration information.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention.

Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method performed at a beacon device for broadcasting position reference signals, said method comprising:
   transmitting a network access signal indicative of a geographical location of said beacon device to a network control device;
   generating position reference signal configuration information and transmitting said position reference signal configuration information as a configuration information signal to said network control device;
   receiving a network control signal from said network control device, said network control signal comprising a configuration control signal indicative of configuration information for broadcast of said position reference signals, wherein said configuration control signal comprises one of a confirmation signal indicating said position reference signal configuration information generated by said beacon device is to be used, or a configuration information signal indicating updated configuration information for broadcast of said position reference signal; and
   broadcasting position reference signals in accordance with said configuration information.

2. A method according to claim 1, wherein said configuration control signal comprises a configuration information signal indicating a time and frequency resource for broadcast of said position reference signal.

3. A method according to claim 2, wherein said generating said position reference signal configuration information comprises one of:
   generating said configuration information in accordance with a predefined generation mechanism stored within said beacon device; and
   generating said configuration information in accordance with a random mechanism configured to randomly select time and frequency resources for transmission of said position reference signals within a set of predefined available resources.

4. A method according to claim 2, wherein said configuration information signal comprises an indication of a time and frequency resource for broadcast of said position reference signal.

5. A method according to claim 1, wherein said network access signal comprises at least one of an indication of carrier frequencies supported by said beacon device, a system frame number initialisation time, a beacon identifier, an access point position indicating an estimated geographical position of an antenna of said beacon device, an indication of position reference signal transmission power, a request for position reference signal configuration information, an indication of physical reference signal transmission capacity and a tracking area code.

6. A method according to claim 1, wherein said transmitting a network access signal indicating a geographical location of said beacon device comprises transmitting a signal indicating multiple transmission points and corresponding indications of multiple geographical locations for said beacon device, said configuration control signal being indicative of configuration information for broadcast of said position reference signals from each of said multiple transmission points.

7. A non-transitory computer-readable medium storing program instructions which, when executed by a processor, cause an apparatus to perform the method according to claim 1.

8. A beacon device for broadcasting position reference signals, said beacon device comprising:
   a transmitter for transmitting a network access signal indicating a geographical location of said beacon device;
   a receiver for receiving a network control signal from a network control device, said network control signal comprising a configuration control signal indicative of configuration information for broadcast of said position reference signals;
   control circuitry configured to control said transmitter to broadcast position reference signals in accordance with said received configuration information; and
   a position reference signal configuration information generator configured to generate position signal configuration information;
   said transmitter being configured to transmit said position reference signal configuration information as a configuration information signal towards said network control device, wherein said configuration control signal comprises one of a confirmation signal indicating said position reference signal configuration information generated by said beacon device is to be used, or a configuration information signal indicating updated configuration information for broadcast of said position reference signal.

9. A beacon device according to claim 8, wherein said configuration control signal comprises a configuration information signal indicating a time and frequency resource for broadcast of said position reference signal.

10. A beacon device according to claim 8, wherein said configuration information signal comprises an indication of a time and frequency resource for broadcast of said position reference signal.

11. A beacon device according to claim 8 wherein said network access signal comprises at least one of: an indication of carrier frequencies supported by said beacon device, a system frame number initialisation time, a beacon identifier, an access point position indicating an estimated geographical position of an antenna of said beacon device, an indication of position reference signal transmission power, a request for position reference signal configuration information, an indication of physical reference signal transmission capacity and a tracking area code.

12. A method performed at a network control device, said method comprising:
   receiving a network access signal indicating a geographical location of a beacon device;

receiving a configuration information signal comprising position reference signal configuration information generated by said beacon device;

generating a configuration control signal, wherein said configuration control signal comprises one of a confirmation information signal indicating said received position reference signal configuration information is to be used or a configuration information signal indicating updated configuration information for broadcast of said position reference signal is to be used;

transmitting said configuration control signal towards said beacon device, said configuration control signal being indicative of configuration information for broadcast of position reference signals; and receiving user equipment responses to said broadcast position reference signals.

13. A method according to claim 12, wherein said configuration control signal comprises a configuration information signal indicating a time and frequency resource for broadcast of said position reference signal.

14. A method according to claim 12, wherein said network control device comprises one of a location server, a network node comprising a base station or E-UTRAN node B, a small cell node and an OAM operations administration and maintenance server.

15. A non-transitory computer-readable medium storing program instructions which, when executed by a processor, cause an apparatus to perform the method according to claim 12.

16. A network control device, comprising:

a receiver configured to receive a network access signals indicating a geographical location of a beacon device and to receive a configuration information signal comprising position reference signal configuration information generated by said beacon device;

a configuration control signal generator configured to generate a configuration control signal comprising one of: a confirmation information signal indicating said received position reference signal configuration information is to be used or a configuration information signal indicating updated configuration information for broadcast of said position reference signal; and a transmitter configured to transmit said configuration control signal towards said beacon device.

17. A network control device according to claim 16, wherein said configuration control signal comprises a configuration information signal indicating a time and frequency resource for broadcast of said position reference signal.

18. A network control device according to claim 16, wherein said network control device comprises one of a location server, a network node comprising a base station or E-UTRAN node B, a small cell node and an OAM operations administration and maintenance server.

* * * * *